Aug. 20, 1957  M. L. DODGE  2,803,343
CAN END SORTING APPARATUS
Filed June 3, 1953  11 Sheets-Sheet 7
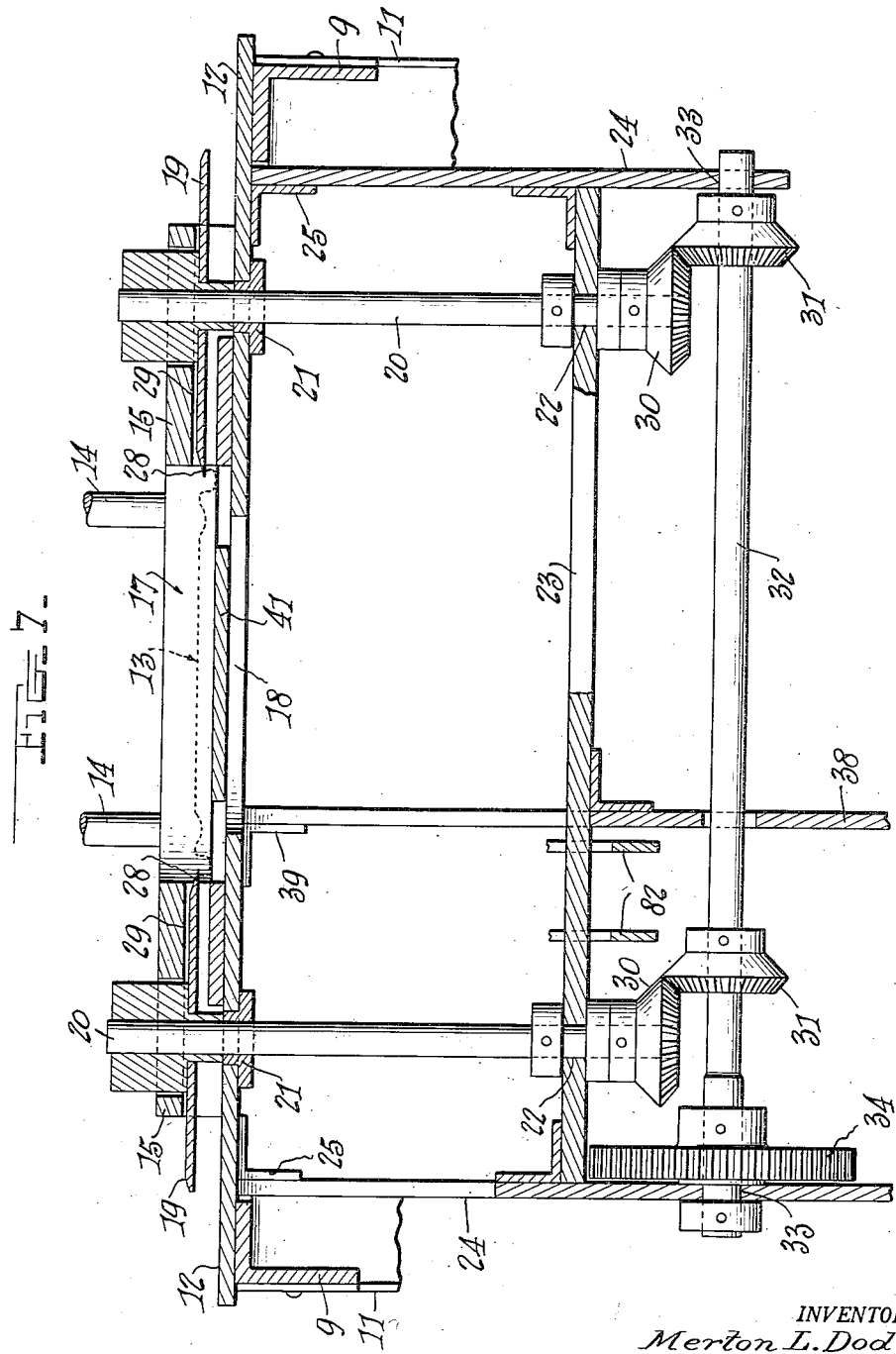
INVENTOR.
Merton L. Dodge
BY
Mason, Porter, Diller & Stewart
ATTYS.

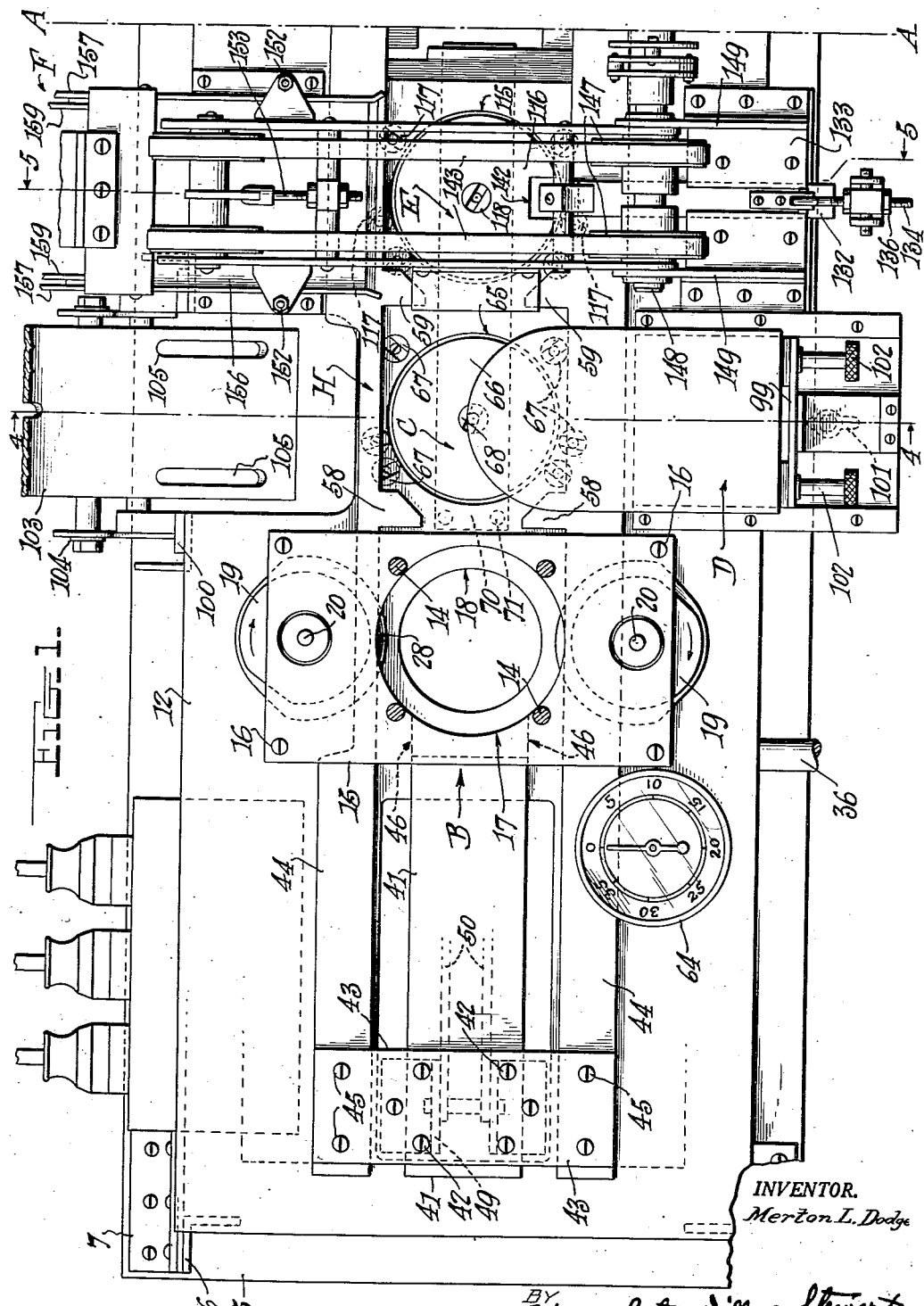

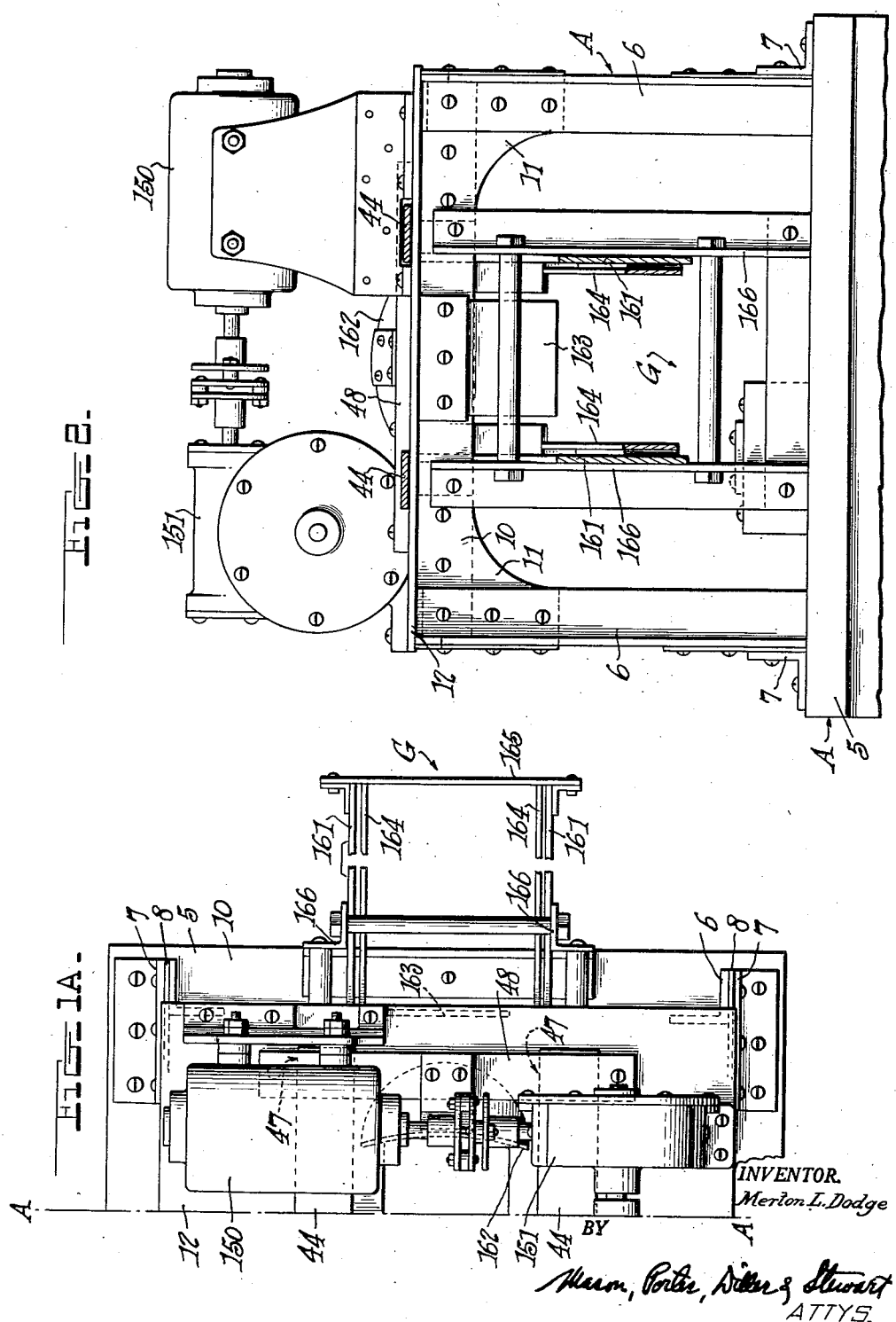

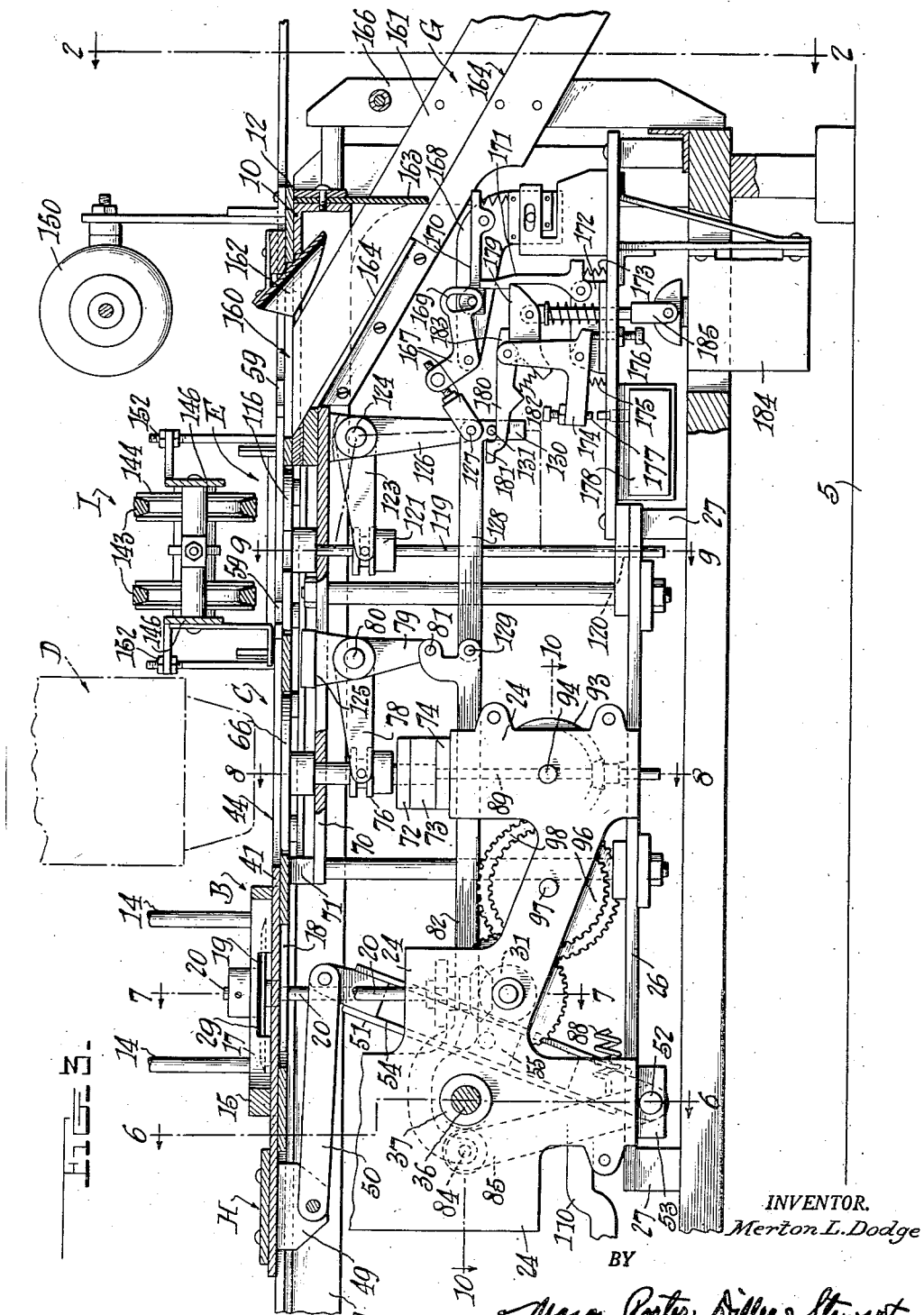

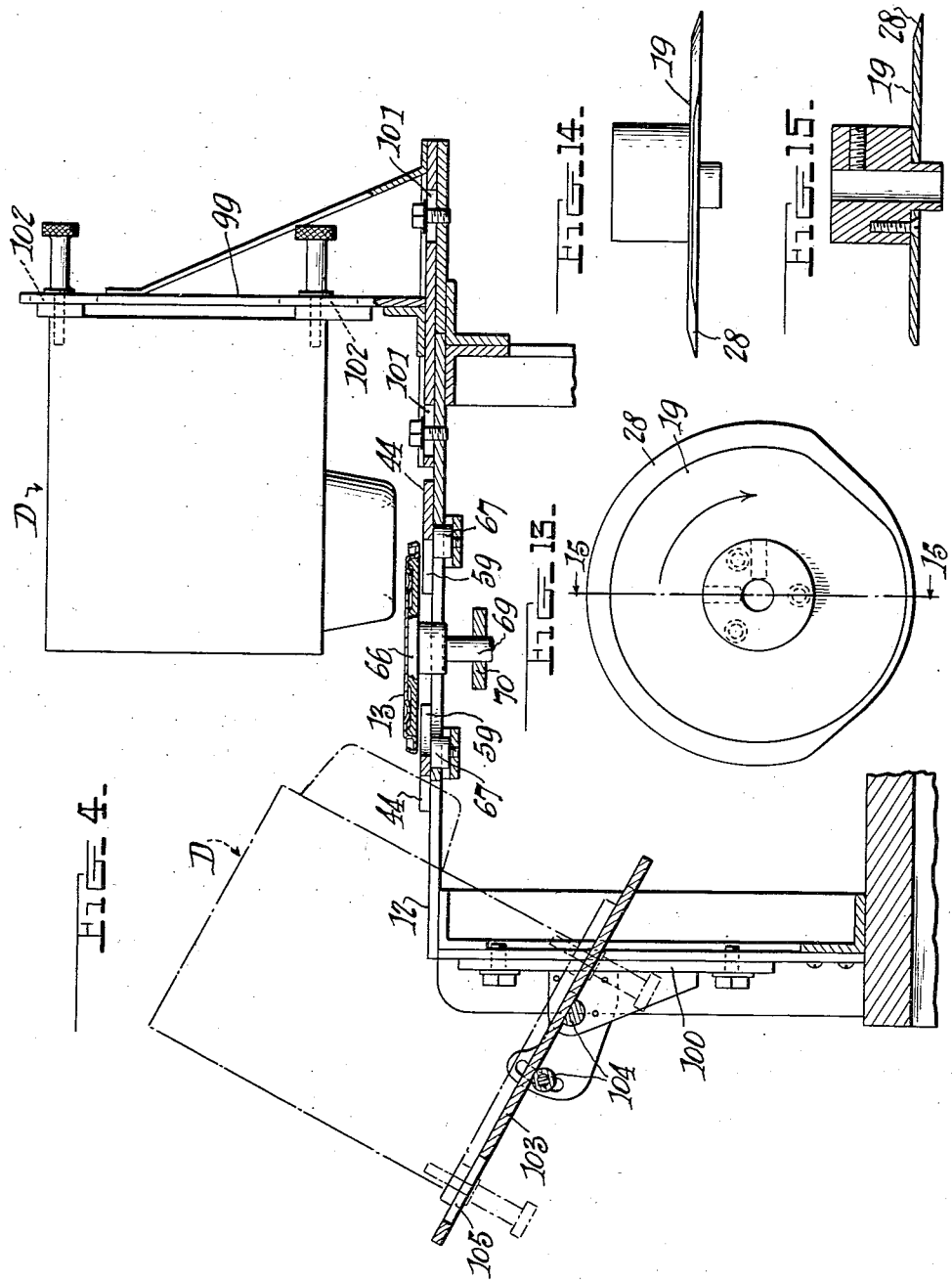

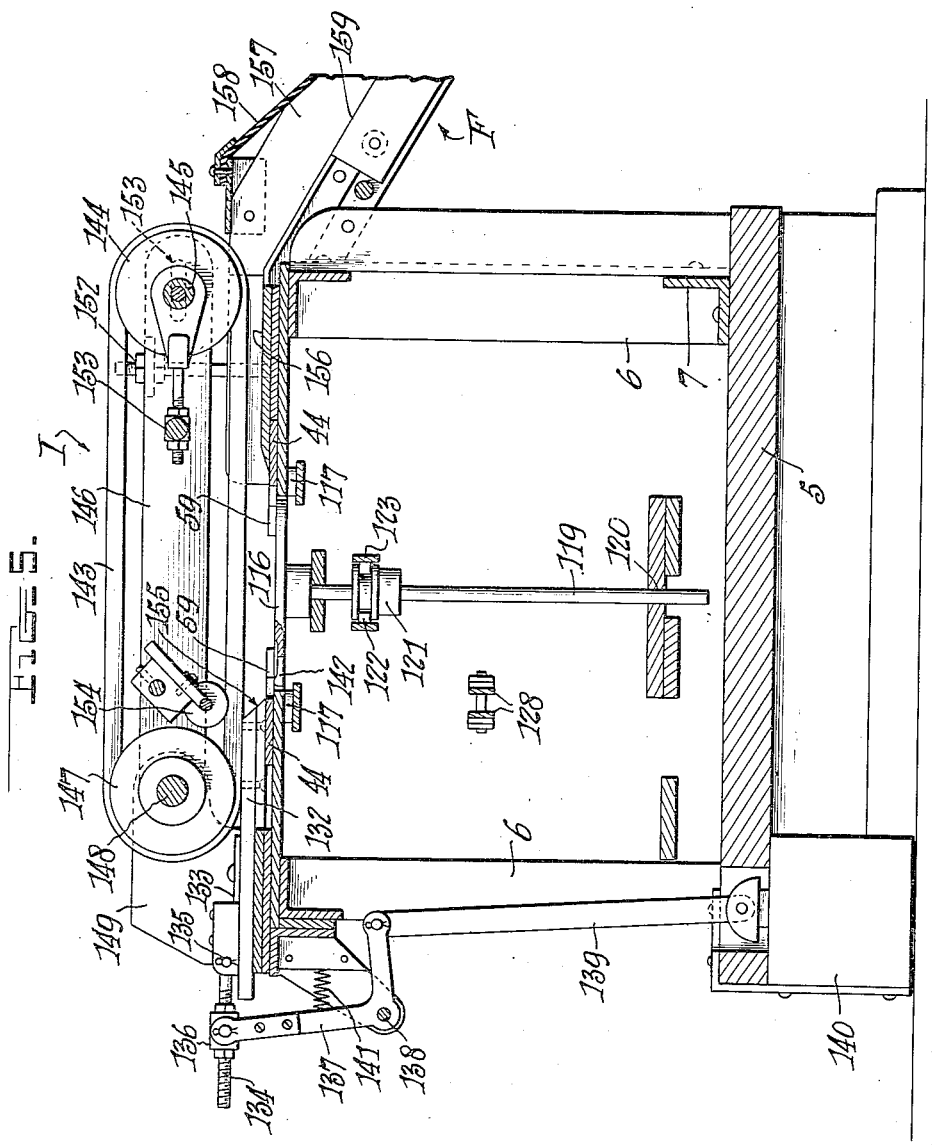

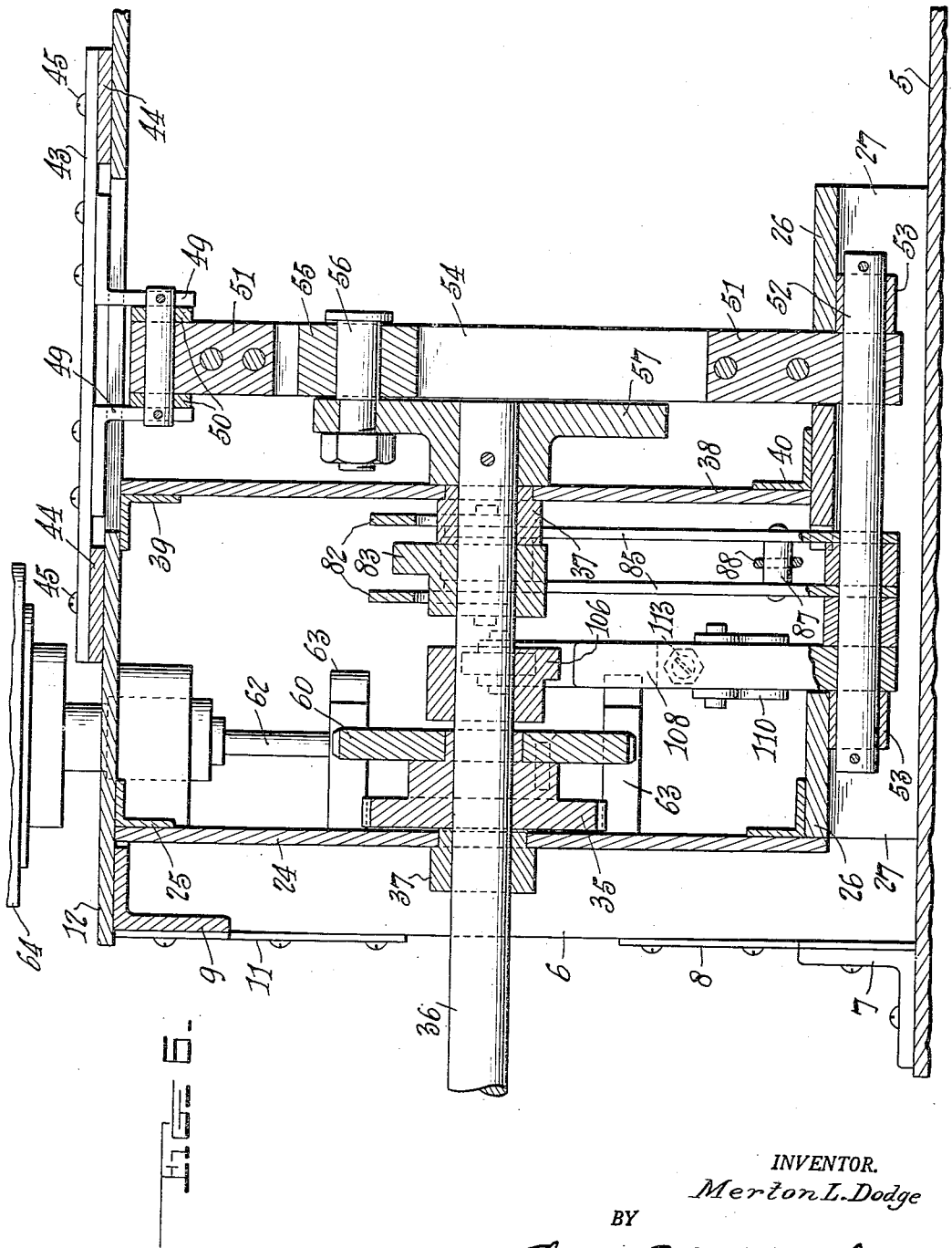

Aug. 20, 1957      M. L. DODGE      2,803,343
CAN END SORTING APPARATUS
Filed June 3, 1953      11 Sheets-Sheet 8
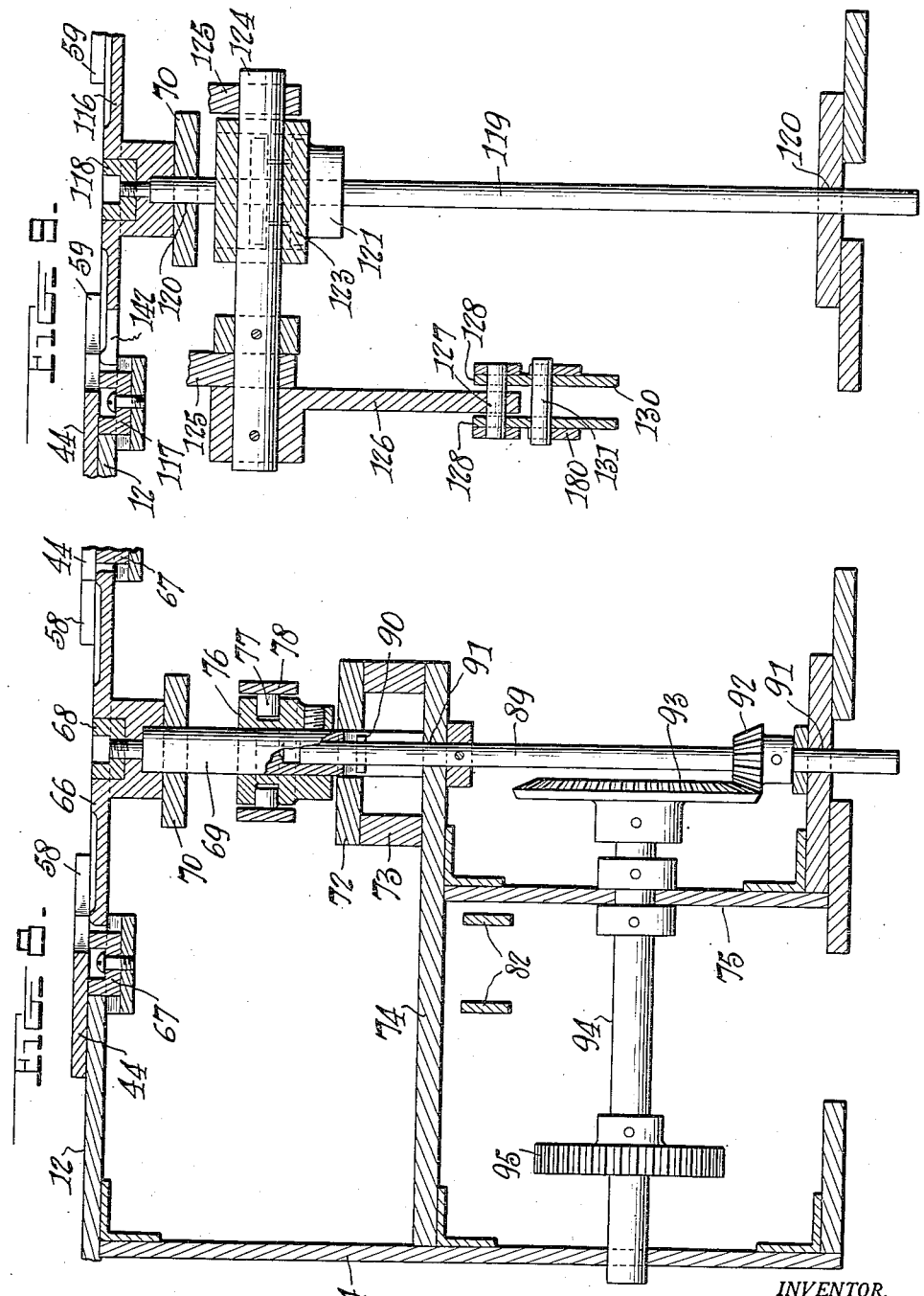
INVENTOR.
Merton L. Dodge
BY
Mason, Porter, Diller & Stewart
ATTYS.

Aug. 20, 1957  M. L. DODGE  2,803,343
CAN END SORTING APPARATUS
Filed June 3, 1953  11 Sheets-Sheet 9
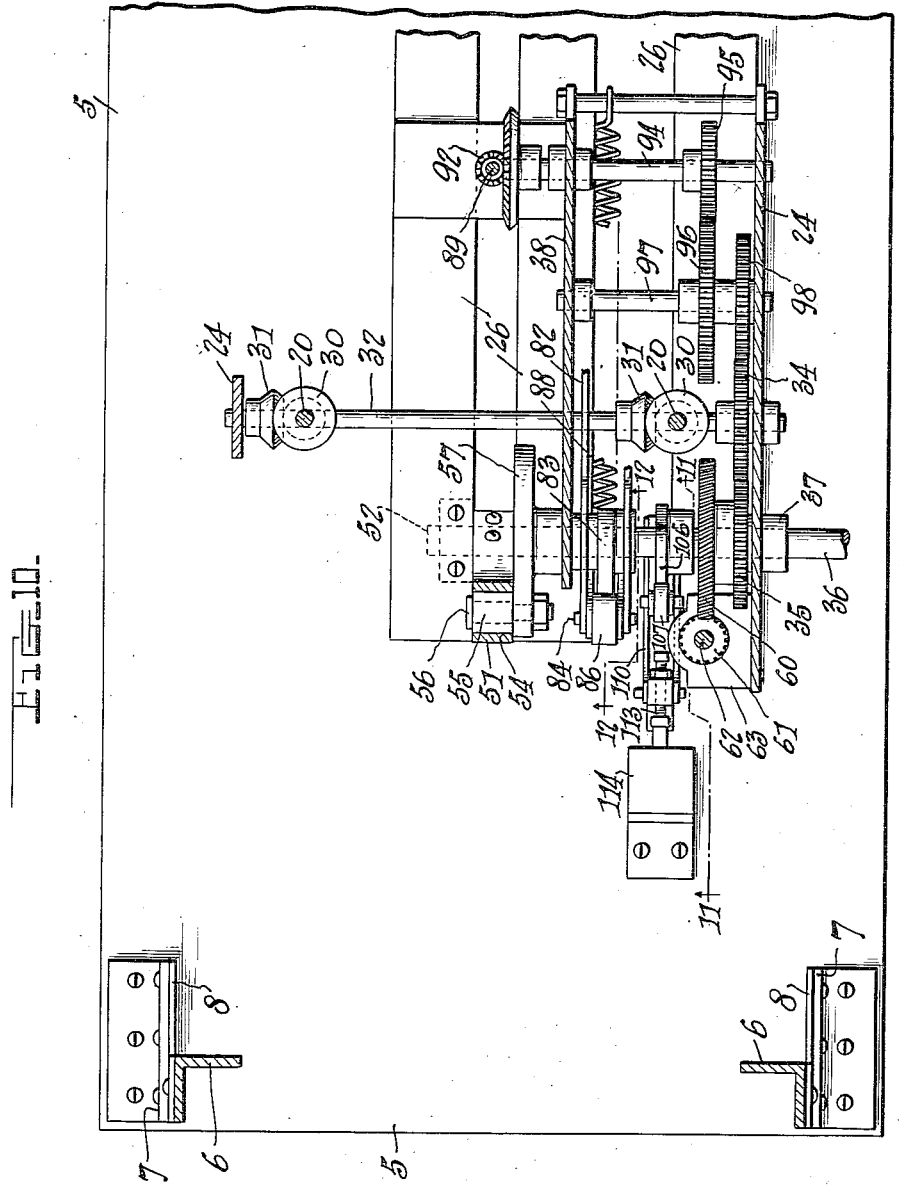
INVENTOR.
Merton L. Dodge
BY
Mason, Porter, Diller & Stewart
ATTYS.

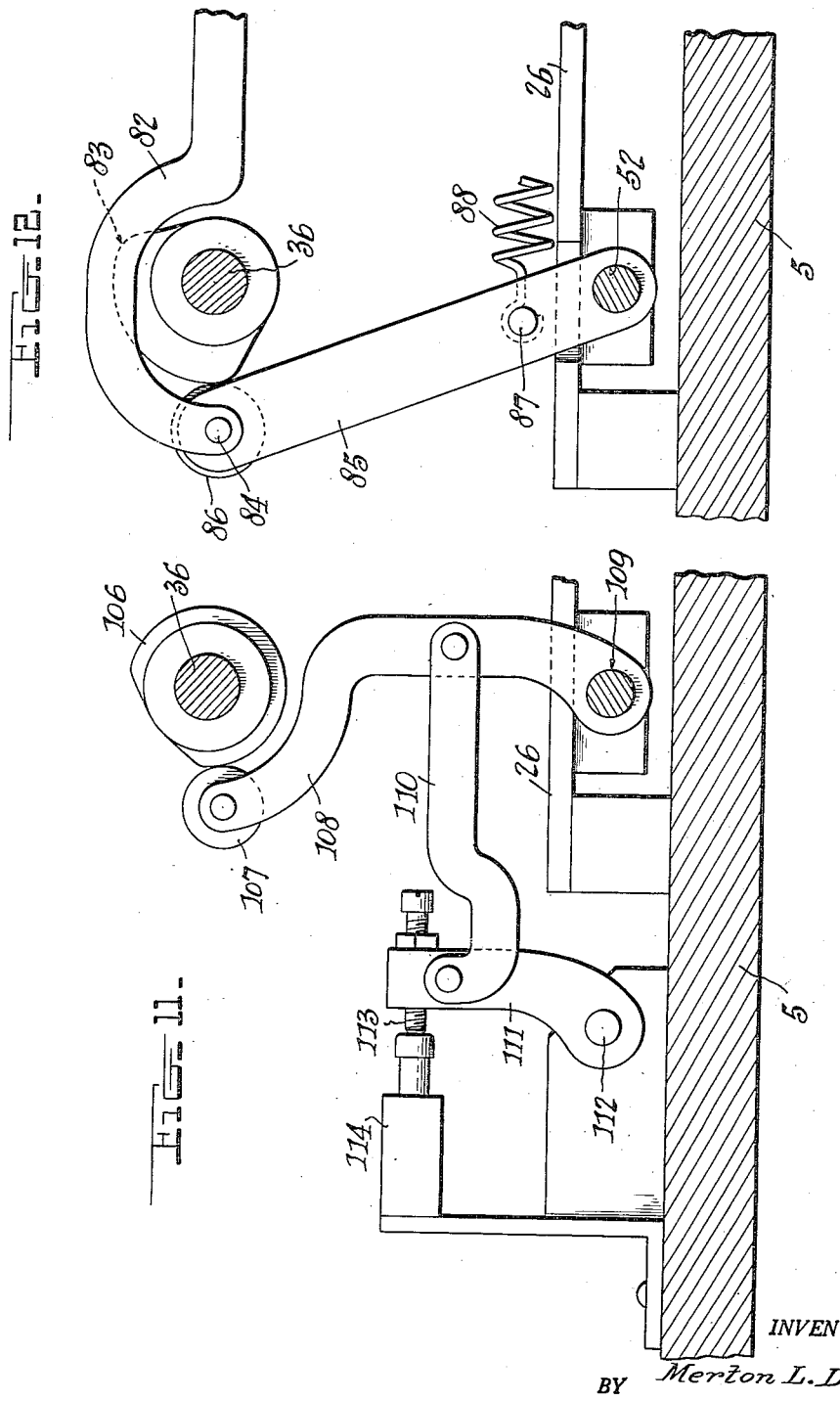

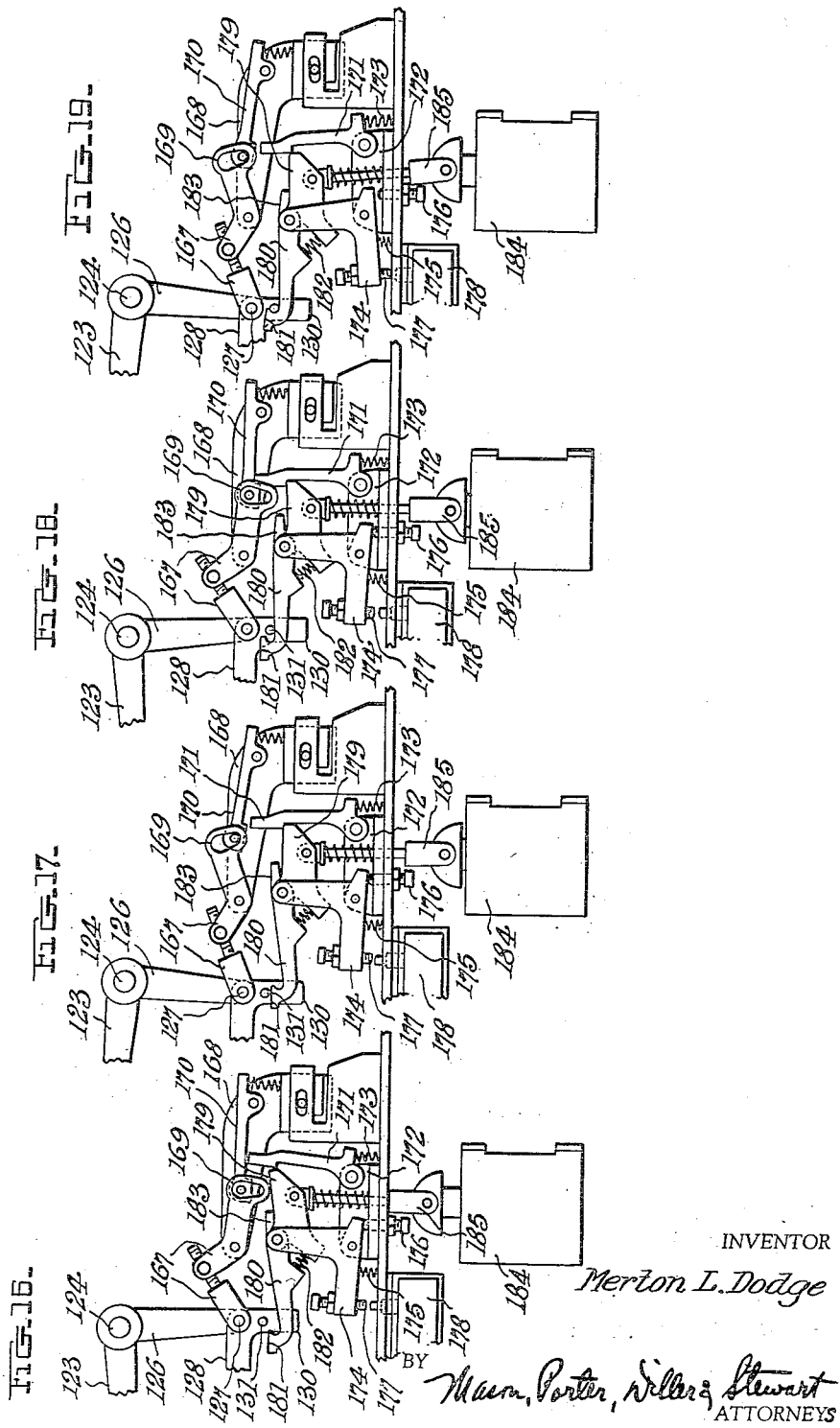

United States Patent Office 2,803,343
Patented Aug. 20, 1957

2,803,343

CAN END SORTING APPARATUS

Merton L. Dodge, Seattle, Wash., assignor to Continental Can Company, Inc., New York, N. Y., a corporation of New York Application June 3, 1953, Serial No. 359,307

26 Claims. (Cl. 209—111)

The invention relates generally to the art of sorting articles and primarily seeks to provide a novel apparatus for detecting imperfections in can ends and delivering perfect can ends at one place for being picked up for storage, shipment or use, and imperfect can ends at another place for being picked up for reclamation or scrapping, depending upon the nature of the imperfection.

It is well known that can ends commonly in use have countersunk central portions surrounded by a channel portion defined peripherally by a terminal edge which is usually curled downwardly and inwardly, although some can ends are devoid of this edge curling. Sealing compound is applied on the can end channel surfaces, and when the can ends are applied to the cans the peripheral edge portions and the channel stock are rolled, with the usual can body flange, into a seam structure for hermetically sealing the cans. It sometimes happens that in the application of sealing compound to the can end channel portions voids will be left at one or more intervals about a channel portion, or a can end completely devoid of sealing compound may find its way into a supply destined for use in a can closing machine. It also happens at times that in the punching out of can ends, edge portions thereof will be clipped so that the peripheries will not be continuous. Obviously such clipped can ends, or can ends wholly or partially devoid of sealing compound, if applied in the usual manner on can bodies, will fail to provide the desired hermetic seal. Therefore, it is an object of the present invention to provide a novel machine structure in which provision is made for detecting clipped can ends, or can ends wholly or partially devoid of sealing compound, and for rejecting such defective can ends.

An object of the invention is to provide a machine of the character stated wherein are included, means for supporting a stack of can ends to be tested, a testing station, a defective can end receiving means, a good can end receiving means, means for feeding can ends from the supporting stack to the testing station, scanning means for testing the can ends for defects at the testing station, and means operable under control of the scanning means to deliver the can ends to the defective can end receiving means or to the good can end receiving means accordingly as the can ends are found to be defective or good.

Another object of the invention is to provide a machine of the character stated wherein there is included a tested can end receiving means to which the can ends are fed from the testing station, and wherein there are included independent means for feeding defective can ends from said tested can end receiving means to the defective can end receiving, and an independent means for feeding good can ends from said tested can end receiving means to the good can end receiving means.

Another object of the invention is to provide a machine of the character stated wherein there is included means for rotating each can end as it is being tested at the testing station.

Another object of the invention is to provide a machine of the character stated wherein a reciprocable feed bar means is employed to feed the can ends to the testing station, from the testing station to the tested can end receiving means, and also good can ends from the tested can end receiving means to the good can end receiving means.

Another object of the invention is to provide a machine of the character stated wherein there are included means for lifting the can ends at the testing station and on the tested can end receiving means so that the reciprocable feed bar means can be retracted relative thereto and also to place the can ends for testing at the testing station.

Another object of the invention is to provide a machine of the character stated wherein the can ends are received on and lifted and lowered by vertically reciprocable receivers at the testing and receiving stations, said receivers conforming in shape to the can end countersinks and having magnets thereon for holding the can ends in position, magnets also being disposed about each said receiver to be effective to hold can ends in place while the receivers are in lowered position.

Another object of the invention is to provide a machine of the character stated wherein means is provided for rotating the receiver at the testing station while the same is elevated so as to effectively place the channel or peripheral edge portion of a can end with relation to the scanning means during testing.

Another object of the invention is to provide a machine of the character stated wherein the means for feeding defective can ends from the tested can end receiving station includes a continuously driven belt means and a kicker means for placing defective can ends in position for being engaged by said belt means and operable under control of the scanning means.

With the above and other objects in view that will hereinafter appear, the nature of the invention will be more clearly understood by reference to the following detailed description, the appended claims and the several views illustrated in the accompanying drawings.

In the drawings:

Figures 1 and 1A, when joined at the line A—A, together comprise a plan view of the machine structure, parts being broken away and in section.

Figure 2 is a vertical cross section taken through the good end receiver or stacker and the feeder bars which push the can ends thereinto being shown in vertical cross section, the section being taken on the line 2—2 on Figure 3.

Figure 3 is a vertical central longitudinal sectional view.

Figure 4 is a fragmentary vertical cross section taken on the line 4—4 on Figure 1, the scanner being shown in full lines in the sealing compound void detecting position, and in dot and dash lines in the clipped edge detecting position.

Figure 5 is a vertical cross section taken on the line 5—5 on Figure 1.

Figure 6 is an enlarged vertical cross section taken on the line 6—6 on Figure 3.

Figure 7 is a fragmentary vertical cross section taken on the line 7—7 on Figure 3.

Figure 8 is a fragmentary vertical cross section taken on the line 8—8 on Figure 3.

Figure 9 is a fragmentary vertical cross section taken on the line 9—9 on Figure 3.

Figure 10 is a fragmentary horizontal section taken on the line 10—10 on Figure 3.

Figure 11 is an enlarged fragmentary vertical longitudinal section taken on the line 11—11 on Figure 10.

Figure 12 is an enlarged fragmentary vertical longitudinal section taken on the line 12—12 on Figure 10.

Figure 13 is an enlarged detail plan view of one of the can end feeder disks.

Figure 14 is an edge view of the disk shown in Figure 13, and Figure 15 is a vertical cross section thereof taken on the line 15—15 on Figure 13.

Figures 16, 17, 18 and 19 are fragmentary longitudinal sectional views respectively illustrating positions of the control devices effective to delay ejection of can ends tested and found defective at the testing station until they are presented at the ejecting station.

In the machine herein disclosed as an example of embodiment of the invention, there are included a frame structure A, supporting means B for can ends which are to be tested, a testing station C, photo-electric scanning means D at the testing station, a receiving station E to which can ends are moved from the testing station, rejected can end receiving means F to which rejected can ends are moved from the receiving station, good can end receiving means G for receiving good can ends from the receiving station, means H for feeding can ends from the supporting means B to the testing station C, the receiving station E and to the good can end receiving means G, and means for feeding rejected can ends from the receiving station E to the rejected can end receiving means F.

The supporting frame structure includes a base 5 and corner uprights 6 secured in any approved manner on the base, as by securing angles 7 and corner brackets 8. The uprights 6 are connected at their upper ends by side angles 9 and end or traversing angles 10, reinforced by corner brackets 11. Top plating 12 is suitably supported on the frame structure.

The can end supporting and forwarding means is best illustrated in Figures 1, 3, 7 and 10 from which it will be apparent that the can ends 13 are stacked by the upright rods or columns 14 which project upwardly from a plate 15 supported as at 16 on the top plating 12 and having an opening or well 17 therein through which the cans are fed downwardly onto the top plate over an opening 18 which is smaller than the can ends. The lowermost can ends are successively separated or fed from the stack by feeder disks 19 which are secured on the upper ends of driver shafts 20 and which are rotated in a clockwise direction. The shafts 20 are rotatable in bearings 21 mounted in the top plating and in bearings 22 in the horizontal frame piece 23 which is supported on side members 24. The side members 24 are secured as at 25 to the top plating, and at their lower portion to horizontal frame pieces 26 which may be supported as at 27 on the base 5. The feeder disks 19 have bevelled cut-off edge portions 28 which are operable through the plate clearances 29 in the manner illustrated in Figures 1 and 7. It will be apparent that as the disks rotate they will alternately support the stack on the projecting edge portions 28, and then drop the stack onto the top plate 12 each time the edge clearances come opposite each other. Following each dropping of the stack, the projecting edge portions 28 will move into position between the lowermost can end in the stack and the overlying can end to separate said lowermost can end from the remainder of the stack and support the stack until the next dropping thereof.

Each feeder disk carrying shaft 20 has a bevel gear 30 at its lower end, and these bevel pinions 30 are driven by bevel pinions 31 mounted on the cross shaft 32 which is rotatable in bearings 33 supported in the side members in the manner clearly illustrated in Figures 7 and 10. A large spur gear 34 is secured on the shaft 32 and is driven by a gear 35 secured on the power shaft 36 which is rotatably supported in the bearings 37 and to which rotation is imparted in any approved manner (not shown). One of the power shaft bearings 37 is mounted on one side frame piece 24, and the other is mounted on the intermediate frame piece 38 which is supported at its top portion as at 39 on the top plate 12 and as at 40 at its lower portion on one of the horizontal frame pieces 26. See Figure 6.

Each can end separated from the stack by the feeder disks 19 falls onto the top plate 12 in advance of a pusher or feeder 41 best shown in Figures 1, 3, 6 and 7. The can end pusher 41 is secured at 42 to a cross head 43 to which longitudinal parallel feed bars 44 are secured as at 45, one thereof being disposed at each side of the can end stack and beneath the respective feeder disk 19. The pusher 41 is slidable in guide clearances 46 in the plate 15, and the bars 44 are guided in guide clearances 47 in the traversing member 48. See Figures 1, 1A and 2.

Bracket members 49 depend from the cross head 43 and are link connected as at 50 to the free upper end of an actuator lever 51 which is pivotally supported at its lower end on a cross shaft 52 which is in turn supported at 53 on the horizontal frame pieces 26. The actuator lever 51 has a longitudinal slot 54 in which a driver block 55 is slidable, the latter being cross pin connected at 56 to a driver disk 57 mounted on and rotatable with the power shaft 36.

It will be apparent by reference to Figures 1 and 3 of the drawings that the feeder bars 44 have two sets of opposing pusher fingers 58—58 and 59—59, the purpose of which will become apparent as the description progresses. As the disk 57 is rotated its rotary motion will be transmitted in the form of reciprocatory movement to the feeder bars 44 and the pusher member 41. A worm driver 60 rotatable with the shaft 36 meshes with and drives a worm pinion 61 on a shaft 62 which is vertically disposed and rotatable in bearings 63. The shaft 62 constitutes the driver for a suitable gage 64 by which the speed of rotation of the shaft 36 and the rate of operation of the machine parts driven thereby can be observed.

The testing station and the parts operable thereat are best shown in Figures 1, 3, 4 and 8. At this station, a round opening 65, smaller than the can ends, is provided in the top plate 12, and a round receiver head 66 is operable in this opening and conforms in shape to the countersink in a can end, as will be apparent by reference to Figure 4. The opening 65 is partially surrounded by recessed permanent magnets 67, and the head 66 also has a permanent magnet 68 recessed at the center thereof. The magnets are disposed with their top surfaces flush with the top surface of the plate 12 and the head 66 and serve to hold the can ends against accidental displacement as they are fed into and out of position over the head 66 and while they are moving with said head.

A receiver head 66 is secured upon the upper end of a shaft 69 which is vertically reciprocable in a guide 70 secured at 71 to the top plate 12 and in a guide 72 supported at 73 on an intermediate horizontal frame piece 74 attached to the adjacent side frame member 24 and to the intermediate vertical frame piece 75 in the manner clearly illustrated in Figure 8. An annularly grooved clutch head 76 is secured on the shaft piece 69, and pins 77 projecting inwardly from the bifurcated end 78 of an arm of the bell crank lever 79 engage in the clutch head groove. The bell crank lever is pivotally supported at 80 on a stationarily mounted bracket and has its other arm connected at 81 to parallel spaced actuator arms 82 which straddle the actuator cam 83 secured on the power shaft 36.

It will be apparent by reference to Figures 10 and 12 that the actuator arms 82 are pivotally connected at 84 with the upper free ends of spaced links 85 having a cam engaged roller 86 between them on the pivot pin 84, and said links 85 are pivoted at their lower ends on the before mentioned cross shaft 52. A cross pin 87 connects the links 85, and an anchored spring 88 is connected to this cross pin and serves to constantly hold the follower roller 86 against the cam 83.

Attention is again directed to Figure 8 from which it will be apparent that the shaft piece 69 is telescoped over a driver shaft 89 at its lower end and has a slot and pin connection 90 with said shaft so that it will be rotatable with said shaft and yet be capable of moving vertically with relation thereto. The shaft 89 is rotatable in bearings 91 and has a bevelled pinion 92 secured thereon to which rotation is imparted by the driver bevel 93 secured on the shaft 94 which is rotatable in bearings provided therefor in the frame pieces 24 and 75. A spur gear 95 is secured on the shaft 94 and has rotation imparted thereto by the intermediate gear 96 mounted on the countershaft 97 also rotatable in bearings provided therefor in the frame pieces 24 and 75. It will be apparent by reference to Figures 3 and 10 that the countershaft 97 has a gear 98 secured thereon and which meshes with and is driven by the before-mentioned gear 34 on the cross shaft 32.

It is to be understood that the photo-electric scanning means generally designated D is of conventional form, and specific description and illustration of the structure and operation of this well known structure is deemed unnecessary. This well known scanning means is designed to operate on any small change or bump in the quantity of light which reaches the photo-electric tube. The light originates at the light source lamp and is projected through the included lens system as an intense spot of light focused on the material to be inspected, in this case the channel surface or the upwardly and inwardly curled peripheral edge extremities of the can ends, as will be apparent by reference to Figure 4. The light is reflected from the can end surface back through the same lens system to the photo tube. Any sudden change in the reflected light will transmit an impulse to the control unit wherein it closes a circuit controlling relay in the well known manner. Such scanning devices are well known and are readily obtainable on the open market. An example of an acceptable scanner is the well known type 42KK1 manufactured by Photoswitch Incorporated of 77 Broadway, Cambridge, Massachusetts as disclosed in their bulletin PD-476 published May 1950 and controlled in the manner disclosed in U. S. Letters Patent 2,401,396 issued to said corporation on June 4, 1946. It will be apparent by reference to Figures 1 and 4 that the scanning unit is selectively mountable, being mounted as illustrated in full lines in Figure 4 when the can end channels are to be tested for perfection of the sealing compound application therein, and as illustrated in dot and dash lines when the can ends are to be tested for continuity of the peripheral edge extremities thereof. When mounted for channel inspection the scanning unit is supported on a bracket 99, and when mounted for can end edge scanning said unit is mounted on a bracket 100. The bracket 99 is horizontally adjustable at 101 so as to permit accurate lining up of the unit with the can end channels, and vertical adjustment is provided at 102 for varying the elevation of the unit. The other bracket 100 includes a supporting shelf portion 103 which is angularly adjustable as at 104, and provision also is made at 105 for adjustment of the scanning unit toward and from the peripheral edge portion of the can ends being tested, thus making it possible to very accurately place the scanning unit with relation to the can end edge extremities.

Attention is directed to Figures 6, 10 and 11 from which it will be apparent that the power shaft 36 also is equipped with a control cam 106 engageable with a roller 107 connected at the bifurcated free end of a lever 108 which is pivotally supported at its lower end as at 109. The lever is link connected at 110 with a switch actuator 111 which is pivotally supported as at 112 on the base 5. The actuator 111 carries an adjustably mounted plunger 113 disposed to be engageable with the plunger of a control switch 114 which serves in a manner later to be described to control the can end scanning periods.

In describing the can end receiving station and the parts operable thereat, attention is directed to Figures 1, 3, 5 and 9. At this station, a round opening 115 is provided in the top plate 12, and like the beforementioned top plate opening 65 this opening is smaller than the diameter of the can ends. A round receiver head 116 is operable in the opening 115 and conforms in shape to the countersink in the can ends. The opening 115 is partially surrounded by recessed permanent magnets 117, and a permanent magnet 118 also is recessed in the center of the receiver head 116. These magnets serve to assure against accidental displacement of the can ends in the manner previously described. The head 116 is mounted on the upper end of a shaft 119 which is vertically reciprocable in upper and lower bearings 120. An annularly grooved clutch head 121 is secured on the shaft 119 and the groove in this clutch head is engaged by inwardly directed pins 122 carried by the bifurcated end of an arm 123 secured on a rock shaft 124 which is rockable in supporting bearings 125. A crank arm 126 is secured on and depends from the rock shaft 124 and is pivotally connected at its lower end as at 127 to an actuator and control link pair 128. The links 128 are pivotally connected at one end to the previously described actuator arms 82 as at 129, and at their other ends are provided with downwardly turned end portions 130 equipped with a cross pin 131, as best shown in Figures 3 and 9 of the drawings.

A reciprocable pusher 132 is slidably guided as at 133 on the top plate 12, and has a threaded actuator 134 pivotally connected therewith as at 135. The actuator 134 is adjustably connected as at 136 to one arm of a bell crank lever 137 which is pivotally mounted at 138 on the frame structure and has its other arm link connected at 139 to the armature of a solenoid 140. A spring 141 constantly tends to retract the pusher 132, and it is to be understood that whenever the solenoid 140 is energized it will serve to impart movement of the pusher toward the right as viewed in Figure 5. Because of the connections previously described, it will be apparent that the can end receiving heads 66 and 116 are vertically reciprocated in unison. Rotation is imparted to the head 66, as previously described, but the head 116 is not rotated. It will be noted that a cut-out or clearance 142 is provided in the edge of the head 116 opposite the pusher 132 so that when the pusher is moved to the right as viewed in Figure 5 or over the head accommodating opening 115, said pusher will not contact the head, then in its elevated position. The purpose of this positioning of the pusher with relation to the head 116 will be described hereinafter.

Extending transversely and in parallel relation over the receiving and ejecting station E are a pair of ejector belts 143 which pass over idler pulleys 144 on a cross shaft carried at one end of a pair of arms 146, and over a pair of driver pulleys 147 mounted on a driver shaft 148. The driver shaft passes through the other ends of the arms 146, said other arm ends being swingable about the axis of the shaft 148 in brackets 149 which are secured on the top plate and frame structure. The shaft 148 is driven from a motor 150 through suitable speed reducing gearing generally designated 151. The free ends of the arms 146 are vertically-adjustably supported as at 152, and the idler pulley supporting shaft 145 is adjustably mounted at 153 for belt tightening purposes. Back-up rollers 154 engage the lower belt flights over the end extremity of the pusher 132 and the adjacent edge of the receiver head 116, and it will be noted that the can end engaging end extremity of the pusher disposed beneath said roller is bevelled to present an uplifting or camming surface 155.

When a can end has been found defective by reason of having an imperfect or incomplete application of sealing compound in the channel thereof, or by reason of having an imperfect, clipped peripheral edge portion, the pusher 132 will be operated through suitable control devices to be described hereinafter to reject said can end from the receiving head 116 while it is elevated at the receiving and rejecting station. As the pusher 132 moves toward the lifted receiving head 116 it will move into the head recess 142 and the camming surface 155 thereof will lift the defective can end so as to displace it upwardly off from the head 116. The rapidly travelling lower belt flights will then engage the can end and eject the same. Can ends ejected in this manner are discharged over the shelf 156 into a laterally and downwardly inclined stacking chute defined between parallel side walls 157, the can ends engaging an overlying flexible retarder 158 and being supported on their edges on side rails 159, ultimately stacking in face to face contact and in vertical position. Defective can ends are removed from the receiving head 116 while it is in elevated position, as before stated, but good can ends are fed away from said head by the feeder fingers 59 while the receiving head is in its lowered position, said fingers 59 and the feeder fingers 58 being projected over both heads 66 and 116 while the heads are in lowered position and being retracted under said heads when they are in the elevated position.

Good can ends discharged by engagement of the feeder fingers 59 are delivered into the drop opening 160 into the good can stacking or receiving means G which like the stacking means F comprises parallel side walls 161 between which the good can ends are guided in part by the fixed diverter 162, being controlled in their movement by the flexible flap 163. The good can ends ride on their edges down the side rails 164 and come against the vertical end wall 165 in face to face contact and in vertical position as in the stacking means F. The side walls 161 may be supported in part by the framing uprights 166.

The link pin 127 of the receiver head lifting and lowering means also is connected with a toggle 167 pivotally supported on an adjustably mounted bracket 168 and having a lost motion connection as at 169 with a spring depressed latch retainer 170 also pivotally mounted on said bracket. The retainer 170 is engageable over the upper end of a latch 171 which is pivotally supported on a bracket 172 and urged toward the left as viewed in Figure 3 by a compression spring 173. The bracket 172 also pivotally supports a switch actuator bell crank 174 which is urged by a compression spring 175 against a limiting stop 176 or to the position shown in Figure 3. An arm of the bell crank 174 projects in a generally horizontal direction and is equipped at its free end with adjustably mounted plunger 177 engageable with the plunger of a micro-switch 178 which must be understood to be connected in circuit with the solenoid 140 of Figure 5 which is effective for controlling the can end lifter or pusher 132. The bell crank 174 also has an upright arm on which is pivotally supported a latching arm 179 and a hook ended actuator arm 180, said arms 179 and 180 projecting in generally horizontal opposite directions as illustrated in Figure 3. The actuator arm 180 is equipped with a horizontal pin riding extension 181, and a compression spring 182 interposed between opposing portions of the arms 179 and 180 serves to yieldably hold said arms in the knee joint relation illustrated in Figure 3 with the heel extension 183 of the arm 180 engaging the underlying portion of the latching arm 179 so that said arms are swingable together and yet are capable of yielding relative movement. A solenoid 184 is supported on the frame structure in the manner illustrated in Figure 3 and is link connected at 185 with the arm 179, and it is to be understood that this solenoid is connected in the scanning unit controlled circuit so as to be energized each time the before mentioned relay of the conventional controlled circuit is energized incidental to the scanning of an imperfection of a can end under test.

The control switch 114 shown in detail in Figure 11 is a blocking switch which makes the scanner head D inoperative until the can end is lifted by the rotating head 66, and the control cam 106 is so constructed and arranged as to keep the scanner unit operatively functioning during a little more than one revolution of said head during each scanning or testing cycle.

It is to be understood that in Figure 3 no can ends are shown, for purposes of clarity. However, the feeder bars 44 and pusher 41 are shown in advanced position toward the right, or in position for placing the last dropped can end at the testing station C, the last tested can end at the receiving and ejecting station E, and any good can end, previously tested as good and moved from said station E, in position for being received in the good can end stacking means G. The receiver heads 66 and 116 are shown in the lowered position and the control parts designated 167 through 185 are in the position they would assume following detection of a can end imperfection at the testing station C, the lowering of the receiver heads 66 and 116 after the scanning of said tested can end, and the shifting of said tested can end into position over the receiver head 116 at the receiving and ejecting station E.

When the imperfection detection took place at the scanning station C it will be remembered the arms 82 and links 128 will have been shifted to the left to move the bell cranks 79 and 126 to the head lifting position, the toggle 167 will have been straightened and the latch retainer 170 lifted off the latch 171, and the pin 131 would overlie and intercept upward movement of the extension 181 of the arm 180 brought about by downward attraction of the arm 179 and the armature of the solenoid 184 energized by the imperfection detecting functioning of the scanning means D. The lowered position of the arm 179 and the elevated position of the yieldably connected arm 180 will be retained by engagement of the arm 179 under the latch 171, and on the next advance movement of the arms 82 and links 128 the pin 131 will ride off the extension 181 and allow the hooked portion thereof to spring up behind the pin. Thus, upon the next retraction of the arms 82 and links 128, to bring about the lifting of another can end at the scanning station C and the imperfect can end at the rejecting station E, the pin 131 moving to the left will move the bell crank 174 with it and cause a depression of the plunger of the switch 178 and an energizing of the solenoid 140 of Figure 5 and the projection of the pusher 132. The cam nose 155 will partially lift the defective can end off the countersink fitting head 116, and the travelling belts 143 will eject the same into the receiver F in the manner before described. Movement of the links 128 to the left also will have caused the toggle 167 to straighten and lift the latch retainer 170 so that the latch 171 is freed to move to the left with the bell crank 174, but because of the positioning of the members 174 and 171 on their pivotal mountings the arm 179 will become disengaged from beneath the latch 171 and the left hand face of the latter above its latching shoulder will come to rest against the right hand end of the arm 179. The ejection of the defective can end is effected in the manner previously described, and as the arms 82 and links again move over to the right, the spring 175 will return the bell crank 174 and the latch 171 to the right retaining the relation or unlatched contact last described, full return of these parts to the right being preceded by a lowering by the toggle 167 of the latch retainer 170 onto the top end of the latch 171, and said latch top end ultimately will slide along the under surface of the retainer 170 until it reaches the retaining position shown in Figure 3.

The parts just described provide a delaying action so that the scanning unit control energization of the solenoid 184 during the testing at station C initiates a part actuation which does not become completely effective to reject the can end found defective at the scanning station until that can end has been shifted to and lifted at the receiving and ejecting station E.

It is to be understood that the pin 131 will be over the horizontal extension portion 181 of the arm 180 whenever the solenoid 184 is energized, unless the can end tested immediately previous to a given energizing of said solenoid was defective, in which case the hooked end of the arm 180 will already be in lifted position and in engagement with the pin 131 in the extreme left hand position. This is true because the scanning of the can ends by the unit D takes place only when the can end receiving heads 66 and 116 are fully lifted, and said heads cannot be in fully lifted position until the pin 131 is moved to the extreme left hand position.

Because of the pin 131 engaging in the undercut of the hooked end of the arm 180, the arm 180 will not be released from said pin until the pin is moved to the right as the heads 66 and 116 are being lowered in unison, but if the can end on the head 66 has been found defective the solenoid 184 will have been energized to re-engage the arm 179 under the latching shoulder of the latch 171 so that the hooked end of the arm 180 will not be lowered when it is released by movement to the right of the pin 131. In other words, the hooked end of the arm 180 is not necessarily lowered after each detecting of a defective can end, because if there is an uninterrupted succession of defective can ends, the arm 180 will remain in the lifted position until after the first succeeding non-defective can end has been scanned. The arm 180 will be released by the pin 131 moving to the right as the good can end is lowered by the supporting head.

In the preceding description individual testing by the scanning units has been stressed, namely testing for faulty sealing compound application, or for clipped edges. This manner of testing makes it possible to collect all defective can ends of a particular kind in a single stack. While it has thus been stressed heretofore that the scanning units may be selectively mounted and used, it is to be understood that in an optional arrangement scanning units may be mounted on both brackets 99 and 103 and connected in series and used simultaneously. In this case, either a clipped edge defect or a channel sealing compound void would bring about a rejection of a can end, and can end rejections of both kinds would be collected in the receiving or stacking means F.

It should also be understood that a scanner unit of a different but well known type adapted for testing color or shade differences could be employed for detecting complete absence of sealing compound in can end channels, rather than mere skips or voids in the sealing compound application. Such a scanning unit could be mounted on the illustrated supporting bracket 99, or it could be mounted on a separate bracket. This unit could be used as a substitute for the one previously described as mounted on the bracket 99, or said unit could be used simultaneously in conjunction with the previously mentioned unit on the bracket 99 and the unit on the bracket 103, said three units being connected in series so that they would serve to detect can ends having clipped edges, partial sealing compound voids and total sealing compound voids, thus bringing about separation of all three forms of defective can ends in the collecting or stacking means F.

Summarizing, briefly, the operation of the control devices which delay ejection of can ends tested and found to be defective at the testing station until they are presented at the ejecting station, reference is made to Figures 16, 17, 18 and 19.

Figure 16 shows the normal positioning of the parts, such as they would assume when all cans being fed through the apparatus are perfect. As previously described, the links 82 and 123 move backward and forward in unison, serving to lift and lower the can end receiving heads 66 and 116.

When a can end is defective, the scanning unit will bring about an energizing of the solenoid 184 while the head 66 is in its raised position, in a manner to be described in detail hereinafter. The parts then would assume the positions shown in Figure 17. The latching arm 179 has been pulled down until its end has been latched under the overhang or hook of the latch 171. This movement raises the arm 180 until its flat surface 181 comes to rest against the pin 131. These movements all take place during the forward rest period of the lever 79, or in other words, while the can end receiving head 66 is in its raised position. On the return stroke of the lever 79 and consequent lowering of the head 66, and at its lowered or rest period, the can end will be moved from station C to station E, as previously described. At the time the head 66 is lowered, the head 116 also is lowered through the medium of the link 128 and the lever 126. This movement of the lever 126 displaces the pin 131 from its position above the surface 181 of the arm 180 and allows the spring 182 to lift the arm 180 to the position illustrated in Figure 18. The next forward movement of the lever 126 and the resulting raising of the head 116 at station E will pull the bell crank 174 over until its plunger 177 depresses the plunger of the microswitch 178, thereby to bring about an energizing of the solenoid 140 shown in Figure 5 and as previously described.

The early part of the forward movement of the lever 126, perhaps half of its travel, will serve to pull the end extremity of the latching arm 179 from beneath the hook portion of the latch 171 as shown in Figure 19 because the retainer 170 will still be down and securing the latch 171 against movement as illustrated in Figure 18. When this operation continues to the full travel of the lever 126, the retainer 170 will be lifted out of engagement with the upper end of the latch 171 by the toggle 167, 169 as shown in Figure 19. The latching arm 179 is still free to travel upward as soon as the lever 126 travels a sufficient distance to permit unhooking of the end of the arm 180 from the pin 131.

So long as no other defective can ends are detected, the parts will re-assume the positions illustrated in Figure 16.

The reason for the retainer 170 being raised only at the extreme forward stroke of the lever 127 is that it will allow re-latching of the arm 179 under the hook of the latch 171 if the solenoid 184 is energized during the top of the stroke of the head 116 by reason of subsequent defective can ends succeeding each other so that the hook on the end of the arm does not become disengaged from the pin 131. See Figure 19.

While one form of the invention has been shown for purposes of illustration, it is to be clearly understood that various changes in the details of construction and arrangement of parts may be made without departing from the spirit and scope of the invention as defined in the appended claims.

I claim:

1. In apparatus of the character described, a can end feedway, a testing station, a defective can end receiving means, a good can end receiving means, means for depositing can ends on said feedway, means for feeding the can ends to the testing station, scanning means at the testing station disposed to direct a testing beam on a peripheral edge portion of each can end presented at the testing station to test can ends for clips in peripheral edge portions thereof, means for rotating each can end presented at the testing station relative to the scanning means while the testing of the can end is in progress, and means operable under control of the scanning means for delivering can ends tested at the testing station to the defective can end receiving means or the good can end receiving means accordingly as the can ends are found to have clipped peripheral edge portions or are properly devoid of such edge clips.

2. In apparatus of the character described, a can end feedway, a testing station, a defective can end receiving means, a good can end receiving means, means for depositing on the feedway can ends having annular channels wherein sealing compound is applied said channels being directed upwardly, means for feeding the can ends to the testing station, scanning means at the testing station disposed to direct a testing beam into the upwardly directed channel in each can end presented at the testing station to test can ends for voids in the application of sealing compound thereon, means for rotating each can end presented at the testing station relative to the scanning means while the testing of the can end is in progress, and means operable under control of the scanning means for delivering can ends tested at the testing station to the defective can end receiving means or the good can end receiving means accordingly as the can ends are found to have voids in the sealing compound application thereon or have properly continuous application of sealing compound thereon.

3. In apparatus of the character described, a can end feedway, a testing station, a defective can end receiving means, a good can end receiving means, means for depositing on the feedway can ends having annular channels wherein sealing compound is applied said channels being directed upwardly, means for feeding the can ends to the testing station, scanning means at the testing station disposed to direct a testing beam into the upwardly directed channel in each can end presented at the testing station to test can ends for voids in the application of sealing compound thereon, means for rotating each can end presented at the testing station relative to the scanning means while the testing of the can end is in progress, and means operable under control of the scanning means for delivering can ends tested at the testing station to the defective can end receiving means or the good can end receiving means accordingly as the can ends are found to have voids in the sealing compound application thereon or have properly continuous applications of sealing compound thereon, means also being included for varying the spacing of the scanning means with relation to a can end presented thereto at the testing station.

4. In apparatus of the character described, a can end feedway, a testing station, a defective can end receiving means, a good can end receiving means, means for depositing can ends on said feedway, means for feeding the can ends to the testing station, scanning means at the testing station disposed to direct a testing beam on a peripheral edge portion of each can end presented at the testing station to test can ends for clips in peripheral edge portions thereof, means for rotating each can end presented at the testing station relative to the scanning means while the testing of the can end is in progress, and means operable under control of the scanning means for delivering can ends tested at the testing station to the defective can end receiving means or the good can end receiving means accordingly as the can ends are found to have clipped peripheral edge portions or are properly devoid of such edge clips, means also being included for varying the angular relation of the scanning means and the can end edge portion under test.

5. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, and the means for feeding can ends found defective at the testing station to the defective can end receiving means comprising an independent feeder means.

6. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, and the means for feeding can ends found defective at the testing station to the defective can end receiving means comprising an independent feeder end receiving means comprising a continuously driven friction belt means.

7. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, a receiver head on which to receive each can end presented at the testing station, means for lifting and lowering said head incidental to each testing cycle to lift the can end above the level of the feedway and present it in proper testing relation to the scanning means and then again lower the can end to the level of the feedway, and means operable under control of the scanning means for delivering can ends tested at the testing station to the defective can end receiving means or the good can end receiving means accordingly as the tested can ends are found to be defective or good.

8. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, a receiver head on which to receive each can end presented at the testing station, means for lifting and lowering said head incidental to each testing cycle to lift the can end above the level of the feedway and present it in proper testing relation to the scanning means and then again lower the can end to the level of the feedway, means for imparting rotation to said head during the testing of can ends thereon, and means operable under control of the scanning means for delivering can ends tested at the testing station to the defective can end receiving means or the good can end receiving means accordingly as the tested can ends are found to be defective or good.

9. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, a receiver head on which to receive each can end presented at the testing station, means for lifting and lowering said head incidental to each testing cycle to lift the can end above the level of the feedway and present it in proper testing relation to the scanning means and then again lower the can end to the level of the feedway, means for imparting rotation to said head during the testing of can ends thereon, magnet means also being provided at the testing station and on said head for assuring against accidental displacement of can ends during testing and while being moved to and from the testing station, and means operable under control of the scanning means for delivering can ends tested at the testing station to the defective can end receiving means or the good can end receiving means accordingly as the tested can ends are found to be defective or good.

10. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, a receiver head on which to receive each can end presented at the testing station, means for lifting and lowering said head incidental to each testing cycle to lift the can end above the level of the feedway and present it in proper testing relation to the scanning means and then again lower the can end to the level of the feedway, means for imparting rotation to said head during the testing of can ends thereon, and means operable under control of the scanning means for delivering can ends tested at the testing station to the defective can end receiving means or the good can end receiving means accordingly as the tested can ends are found to be defective or good, and said means for feeding the can ends to the testing station and from said station comprises a reciprocatory feeder means projectable over the rotary lifter head while said head is lowered and retractable under said head while it is raised during the testing of a can end.

11. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station, a receiver head on which to receive each can end presented at the receiving end ejecting station, means for lifting and lowering said heads during each testing cycle to lift the can ends above the level of the feedway and present the can end at the testing station in proper testing relation to the scanning means and then again lower the can ends to the level of the feedway, means for feeding good can ends from the receiving and ejecting station to the good can end receiving means, and means operable under control of the scanning means for feeding from the can end receiving and ejecting station to the defective can end receiving and ejecting station to the defective can end receiving means a can end found defective during testing thereof at the testing station.

12. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station, a receiver head on which to receive each can end presented at the receiving and ejecting station, a common means for simultaneously lifting and lowering said heads during each testing cycle to lift the can ends above the level of the feedway and present the can end at the testing station in proper testing relation to the scanning means and then again lower the can ends to the level of the feedway, means for feeding good can ends from the receiving and ejecting station to the good can end receiving means, and means operable under control of the scanning means for feeding from the can end receiving and ejecting station to the defective can end receiving means a can end found defective during testing thereof at the testing station.

13. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station, a receiver head on which to receive each can end presented at the receiving and ejecting station, a common means for simultaneously lifting and lowering said heads during each testing cycle to lift the can ends above the level of the feedway and present the can end at the testing station in proper testing relation to the scanning means and then again lower the can ends to the level of the feedway, means for imparting rotation to the head at the scanning station during the testing of can ends thereon, means for feeding good can ends from the receiving and ejecting station to the good can end receiving means, and means operable under control of the scanning means for feeding from the can end receiving and ejecting station to the defective can end receiving means a can end found defective during testing thereof at the testing station.

14. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station, a receiver head on which to receive each can end presented at the receiving and ejecting station, a common means for simultaneously lifting and lowering said heads during each testing cycle to lift the can ends above the level of the feedway and present the can end at the testing station in proper testing relation to the scanning means and then again lower the can ends to the level of the feedway, means for imparting rotation to the head at the scanning station during the testing of can ends thereon, magnet means also being provided at each of said testing and receiving and ejecting stations and on each said head for assuring against accidental displacement of can ends at said stations and while they are being moved to and from said stations, means for feeding good can ends from the receiving and ejecting station to the good can end receiving means, and means operable under control of the scanning means for feeding from the can end receiving and ejecting station to the defective can end receiving means a can end found defective during testing thereof at the testing station.

15. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station, a receiver head on which to receive each can end presented at the receiving and ejecting station, a common means for simultaneously lifting and lowering said heads during each testing cycle to lift the can ends above the level of the feedway and present the can end at the testing station in proper testing relation to the scanning means and then again lower the can ends to the level of the feedway, means for imparting rotation to the head at the scanning station during the testing of can ends thereon, magnet means also being provided at each of said testing and receiving and ejecting stations and on each said head for assuring against accidental displacement of can ends at said stations and while they are being moved to and from said stations, means for feeding good can ends from the receiving and ejecting station to the good can end receiving means, and means operable under control of the scanning means for feeding from the can end receiving and ejecting station to the defective can end receiving means a can end found defective during testing thereof at the testing station, and said means for feeding the can ends to the testing station, from the testing station to the receiving and ejecting station and from the receiving and ejecting station to the good can end receiving means comprising a common reciprocatory feeder means projectable over the heads at the testing and receiving and ejecting stations while said heads are lowered and retractable under said heads while they are raised during the testing of a can end.

16. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, and said means for feeding can ends found defective at the testing station to the defective can end receiving means comprising an independent feeder means including a continuously driven friction belt means, and there also being included lifter means operable under control of the scanning means for presenting a can end found defective during testing for ejection effecting contact by said belt means.

17. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, means for feeding good can ends from the receiving and ejecting station to the good can end receiving means, and means operable under control of the scanning means for feeding from the can end receiving and ejecting station to the defective can end receiving means a can end found defective during testing thereof at the testing station, said last named means including a continuously driven feeder belt means, and lifter means operable under control of the scanning means for presenting a can end found defective during testing for ejection effecting contact with said belt means.

18. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, a receiver head on which to receive each can end presented at the testing station and a receiver head on which to receive each can end presented at the receiving and ejecting station, means for lifting and lowering said heads during each testing cycle to lift the can ends above the level of the feedway and present the can end at the testing station in proper testing relation to the scanning means and the can ends at the receiving and ejecting station in cooperative relation to the defective can end ejection feeding means, said last named means including a continuously driven feeder belt means, and a can end lifter operable under scanning means control for lifting a defective can end above the head at the receiving and ejecting station and contacting it with the belt means to be ejected thereby, means for feeding good can ends from the receiving and ejecting station to the good can end receiving means, and means operable under control of the scanning means for feeding from the can end receiving and ejecting station to the defective can end receiving means a can end found defective during testing thereof at the testing station.

19. In apparatus of the character described, a testing station, a defective can end receiving means, a good can end receiving means, means for presenting can ends at the testing station, means for testing can ends for defects at the testing station, means for feeding good can ends to the good can end receiving means, and means for feeding defective can ends to the defective can end receiving means, each said receiving means including a pair of laterally spaced rails for supporting can ends on their edges in upright position, an upright wall traversing said rails and effective for stacking the can ends in face to face relation and with their edges uprightly disposed, and a flexible flap retarder engageable by each can end as it moves onto the rails toward the traversing wall.

20. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, means for feeding good can ends from the receiving and ejecting station to the good can end receiving means, a receiver head on which to receive each can end presented at the testing station and a receiver head on which to receive each can end presented at the receiving and ejecting station, a common means for simultaneously lifting and lowering said heads during each testing cycle to lift the can ends above the level of the feedway and present the can end at the testing station in proper testing relation to the scanning means and then again lower the can ends to the level of the feedway, means for imparting rotation to the head at the scanning station during the testing of can ends thereon, cam operated means operating in timed relation to the lifting and lowering of the heads and the rotation of the head at the scanning station for controlling the period of scanning during each can end testing cycle, and means operable under control of the scanning means for feeding from the can end receiving and ejecting station to the defective can end receiving means a can end found defective during testing thereof at the testing station.

21. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, and said means for feeding can ends found defective at the testing station to the defective can end receiving means comprising an independent feeder means including a continuously driven friction belt means, lifter means for presenting a can end found defective during testing for ejection effecting contact by said belt means, electrically operated means for actuating the lifter means, a constantly moving actuator, a connecting device movable into and out of position for engaging with and being moved by said actuator to bring about an electrically operated actuation of the lifter means, solenoid means controlled by the scanning means during testing of a defective can end at the testing station for placing the connecting device in position for being engaged by the constantly moving actuator, and means for delaying effective movement imparting contact between said actuator and connecting device until the defective can end has been presented at the receiving and ejecting station.

22. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, and said means for feeding can ends found defective at the testing station to the defective can end receiving means comprising an independent feeder means including a continuously driven friction belt means, lifter means for presenting a can end found defective during testing for ejection effecting contact by said belt means, electrically operated means for actuating the lifter means, a constantly moving actuator, a connecting device movable into and out of position for engaging with and being moved by said actuator to bring about an electrically operated actuation of the lifter means, solenoid means controlled by the scanning means during testing of a defective can end at the testing station for placing the connecting device in position for being engaged by the constantly moving actuator, means for delaying effective movement imparting contact between said actuator and connecting device until the defective can end has been presented at the receiving and ejecting station, and means effective upon presentation of an uninterrupted succession of defective can ends at the testing station for retaining the connecting device in position for being engaged by the constantly moving actuator until after the first succeeding good can end has been scanned at the testing station.

23. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, means for feeding good can ends from the receiving and ejecting station to the good can end receiving means, and means operable under control of the scanning means for feeding from the can end receiving and ejecting station to the defective can end receiving means a can end found defective during testing thereof at the testing station, said last named means including a continuously driven feeder belt means, lifter means operable under control of the scanning means for presenting a can end found defective during testing for ejection effecting contact with said belt means, and roller means backing up said belt means approximate the place at which can ends are lifted into contact therewith.

24. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, means for feeding good can ends from the receiving and ejecting station to the good can end receiving means, a receiver head on which to receive each can end presented at the testing station, a receiver head on which to receive each can end presented at the receiving and ejecting station, constantly moving means for effecting a lifting and lowering of said heads during each testing cycle to lift the can ends above the level of the feedway and present the can end at the testing station in proper testing relation to the scanning means and the can end at the receiving and ejecting station in coopera-
tive relation to the defective can end ejection feeding means, said last named means including a continuously driven feeder belt, lifter means for preventing a can end found defective during testing for ejection effecting contact by said belt means, electrically operated means for actuating the lifter means, a connecting device movable into and out of position for engaging with and being moved by said constantly moving means to bring about an electrically operated actuation of the lifter means, solenoid means controlled by the scanning means during testing of a defective can end at the testing station for placing the connecting device in position for being engaged by the constantly moving means, and means for delaying effective movement imparting contact between said constantly moving means and connecting device until the defective can end has been presented at the receiving and ejecting station.

25. In apparatus of the character described, a can end feedway, a testing station, a tested can end receiving and ejecting station, a defective can end receiving means, a good can end receiving means, means for depositing can ends on the feedway, means for feeding can ends to the testing station, scanning means for testing the can ends for defects at the testing station, means for feeding tested can ends from the testing station to the receiving and ejecting station, means for feeding good can ends from the receiving and ejecting station to the good can end receiving means, a receiver head on which to receive each can end presented at the testing station and a receiver head on which to receive each can end presented at the receiving and ejecting station, means for lifting and lowering said heads during each testing cycle to lift the can ends above the level of the feedway and present the can end at the testing station in proper testing relation to the scanning means and the can end at the receiving and ejecting station in cooperative relation to the defective can end ejection feeding means, said last named means including a continuously driven feeder belt means, a can end lifter reciprocable toward and from the receiver head at the receiving and ejecting station under scanning means control and having a cam nose for lifting a defective can end above said head and contacting it with the belt means to be ejected thereby, said last named head having an edge clearance therein in which to receive said can end lifter, and means operable under control of the scanning means for feeding from the can end receiving and ejecting station to the defective can end receiving means a can end found defective during testing thereof at the testing station.

26. In apparatus of the character described, a can end feedway, a testing station, a defective can end receiving means, a good can end receiving means, means for depositing can ends on said feedway, means for feeding the can ends to the testing station, scanning means for testing the can ends for defects at the testing station, and means operable under control of the scanning means for delivering can ends tested at the testing station to the defective can end receiving means or the good can end receiving means accordingly as the tested can ends are found to be defective or good, said means for feeding the can ends to the testing station and from the testing station to the good can end receiving means comprising a common reciprocatory feeder means, said means for feeding can ends found defective at the testing station to the defective can end receiving means comprising an independent feeder means including a continuously driven friction belt means, lifter means for presenting a can end found defective during testing for ejection effecting contact by said belt means, electrically operated means for actuating the lifter means, a constantly moving actuator, a connecting device movable into and out of position for engaging with and being moved by said actuator to bring about an electrically operated actuation of the lifter means, solenoid means controlled by the scanning means during testing of a defective can end at the testing station for placing the connecting device in position for being engaged by the constantly moving actuator, said connecting device having an extension ineffectually engageable with the constantly movable actuator when the tested can end is at the testing station and an effectual abutment portion with which said actuator is engageable only when the tested can end has been moved to the receiving and ejecting station and said actuator being movable over said extension until said abutment is reached, thereby to delay effective movement imparting contact between said actuator and connecting device until the defective can end has been represented at the receiving and ejecting station.

References Cited in the file of this patent

UNITED STATES PATENTS

| | | |
|---|---|---|
| 1,922,188 | Zworykin | Aug. 15, 1933 |
| 1,983,388 | Moore | Dec. 4, 1934 |
| 2,070,339 | Moore | Feb. 9, 1937 |
| 2,247,684 | Hickok | July 1, 1941 |
| 2,317,559 | Stout | Apr. 27, 1943 |
| 2,520,324 | Mirfield et al. | Aug. 29, 1950 |